US011766949B2

(12) United States Patent
Salter et al.

(10) Patent No.: US 11,766,949 B2
(45) Date of Patent: Sep. 26, 2023

(54) CHARGING NOTIFICATION STRATEGIES FOR VEHICLE-TO-RECREATIONAL VEHICLE ENERGY TRANSFER SYSTEMS

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Peter Phung, Windsor (CA); Katherine Howard-Cone, Canton, MI (US); Paul Kenneth Dellock, Northville, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 345 days.

(21) Appl. No.: 17/335,345

(22) Filed: Jun. 1, 2021

(65) Prior Publication Data

US 2022/0379767 A1    Dec. 1, 2022

(51) Int. Cl.
| | |
|---|---|
| *B60L 53/66* | (2019.01) |
| *B60L 53/57* | (2019.01) |
| *B60L 53/62* | (2019.01) |
| *B60L 50/60* | (2019.01) |
| *B60L 53/18* | (2019.01) |
| *B60L 53/16* | (2019.01) |
| *B60K 6/28* | (2007.10) |

(52) U.S. Cl.
CPC ............ *B60L 53/66* (2019.02); *B60L 50/66* (2019.02); *B60L 53/16* (2019.02); *B60L 53/18* (2019.02); *B60L 53/57* (2019.02); *B60L 53/62* (2019.02); *B60K 6/28* (2013.01); *B60L 2200/12* (2013.01); *B60Y 2200/91* (2013.01); *B60Y 2200/92* (2013.01); *B60Y 2300/91* (2013.01)

(58) Field of Classification Search
CPC ........................................................ B60L 53/66
USPC ........................................................ 320/109
See application file for complete search history.

(56) References Cited

U.S. PATENT DOCUMENTS

| | | | |
|---|---|---|---|
| 8,860,362 B2 | 10/2014 | Kamen et al. | |
| 10,611,247 B1* | 4/2020 | Breen | H02J 7/1423 |
| 2004/0048598 A1* | 3/2004 | Gagnon | G08G 1/205 |
| | | | 455/427 |
| 2013/0197748 A1* | 8/2013 | Whitaker | B60L 53/305 |
| | | | 701/1 |
| 2018/0033311 A1* | 2/2018 | Berggren | G01S 19/01 |
| 2019/0210612 A1* | 7/2019 | VanLandingham | B60W 10/08 |

(Continued)

FOREIGN PATENT DOCUMENTS

EP    3188141 A1    7/2017

*Primary Examiner* — Jerry D Robbins
(74) *Attorney, Agent, or Firm* — David B. Kelley; Carlson, Gaskey & Olds, P.C.

(57) ABSTRACT

Systems and methods may coordinate and execute bidirectional energy transfer events between electrified vehicles and one or more participating electrified recreational vehicles. The proposed systems and methods may be configured to provide charging alert notifications from the electrified vehicle to the one or more electrified recreational vehicles during group off-roading events. The charging alert notifications indicate the need for the one or more electrified recreational vehicles to return to the electrified vehicle for charging during the off-roading event in order to avoid a no start/stranded condition.

20 Claims, 7 Drawing Sheets

(56) References Cited

U.S. PATENT DOCUMENTS

2022/0123570 A1* 4/2022 Fuchs .................... B60L 53/305
2022/0148352 A1* 5/2022 Schuh .................. G07C 5/0808

* cited by examiner

CHARGING NOTIFICATION STRATEGIES FOR VEHICLE-TO-RECREATIONAL VEHICLE ENERGY TRANSFER SYSTEMS

TECHNICAL FIELD

This disclosure is directed to systems and methods for coordinating and communicating charging alert notifications in preparation for vehicle-to-recreational vehicle bidirectional energy transfers.

BACKGROUND

Electrified vehicles differ from conventional motor vehicles because they are selectively driven by one or more traction battery powered electric machines. The electric machines can propel the electrified vehicles instead of, or in combination with, an internal combustion engine. Recreational vehicles such as motorcycles, all-terrain vehicles (ATVs), and utility vehicles (UTVs) may also be electrified and thus can likewise include battery powered electric machines for propelling the recreational vehicles. The traction batteries of both electrified vehicles and electrified recreational vehicles must be periodically charged for replenishing energy storage levels.

SUMMARY

A vehicle-to-recreational vehicle energy transfer system according to an exemplary aspect of the present disclosure includes, among other things, an electrified vehicle, an electrified recreational vehicle, and a control module programmed to command communication of a charging alert notification to the electrified recreational vehicle when a no start/stranded condition of the electrified recreational vehicle is predicted to be likely.

In a further non-limiting embodiment of the foregoing system, the electrified vehicle includes a first traction battery pack and a first electric machine, and the electrified recreational vehicle includes a second traction battery pack and a second electric machine.

In a further non-limiting embodiment of either of the foregoing systems, the control module is programmed to predict that the no start/stranded condition is likely when greater than a predefined percentage of a remaining state of charge of a traction battery pack of the electrified recreational vehicle is required in order for the electrified recreational vehicle to travel a relative distance between the electrified recreational vehicle and the electrified vehicle.

In a further non-limiting embodiment of any of the foregoing systems, the control module is programmed to predict that the no start/stranded condition is likely when a remaining state of charge of a traction battery pack of the electrified recreational vehicle is less than or equal to a predefined percentage of an amount of charge required to reach a current location of the electrified recreational vehicle relative to the electrified vehicle.

In a further non-limiting embodiment of any of the foregoing systems, a charge cable is connectable to a first charge port assembly of the electrified vehicle and a second charge port assembly of the electrified recreational vehicle during a bidirectional energy transfer event.

In a further non-limiting embodiment of any of the foregoing systems, the control module is further programmed to collect data from the electrified recreational vehicle during an off-roading event.

In a further non-limiting embodiment of any of the foregoing systems, the data includes location data and battery capacity/range data.

In a further non-limiting embodiment of any of the foregoing systems, the control module is a component of the electrified vehicle.

In a further non-limiting embodiment of any of the foregoing systems, the control module is further programmed to receive a charging profile from the electrified recreational vehicle.

In a further non-limiting embodiment of any of the foregoing systems, the control module is further programmed to command an alert system of the electrified vehicle to emit audible instructions for guiding a connection of the electrified vehicle to the electrified recreational vehicle prior to performing a bidirectional energy transfer event.

In a further non-limiting embodiment of any of the foregoing systems, the control module is further programmed to communicate the charging alert notification to at least one additional electrified recreational vehicle.

In a further non-limiting embodiment of any of the foregoing systems, the control module is further programmed to communicate driving instructions to the electrified recreational vehicle when the electrified recreational vehicle has an insufficient amount of remaining travel range to return to the electrified vehicle during an off-roading event.

In a further non-limiting embodiment of any of the foregoing systems, the electrified vehicle is a pickup truck, and the electrified recreational vehicle is an all-terrain vehicle, a utility vehicle, a motorcycle, or a snowmobile.

An electrified vehicle according to another exemplary aspect of the present disclosure includes, among other things, a telecommunications module and a control module operably connected to the telecommunications module. The control module is programmed to collect data from an electrified recreational vehicle during an off-roading event, predict a likelihood of a no start/stranded condition of the electrified recreational vehicle based on the data, and in response to predicting the no start/stranded condition is likely, command the telecommunications module to communicate a charging alert notification to the electrified recreational vehicle.

In a further non-limiting embodiment of the foregoing electrified vehicle, the data includes location data and battery capacity/travel range data.

In a further non-limiting embodiment of either of the foregoing electrified vehicles, the no start/stranded condition is predicted as being likely when a relative distance between the electrified recreational vehicle and the electrified vehicle is greater than a predefined percentage of an available travel range of the electrified recreational vehicle.

In a further non-limiting embodiment of any of the foregoing electrified vehicles, the no start/stranded condition is predicted as being likely when a remaining state of charge of a traction battery pack of the electrified recreational vehicle is less than or equal to a predefined percentage of an amount of charge that was required to reach a current location of the electrified recreational vehicle.

In a further non-limiting embodiment of any of the foregoing electrified vehicles, the control module is further programmed to communicate driving instructions to the electrified recreational vehicle when the electrified recreational vehicle has an insufficient amount of remaining travel range to return to the electrified vehicle during the off-roading event.

In a further non-limiting embodiment of any of the foregoing electrified vehicles, the charging alert notification indicates a need to return to the electrified vehicle for charging to a user of the electrified recreational vehicle.

A method according to another exemplary aspect of the present disclosure includes, among other things, collecting data from an electrified recreational vehicle during an off-roading event, predicting a likelihood of a no start/stranded condition of the electrified recreational vehicle based on the data, and in response to predicting that the no start/stranded condition is likely, communicating a charging alert notification to the electrified recreational vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and executing bidirectional energy transfer events between electrified vehicles and one or more participating electrified recreational vehicles. The proposed systems and methods may be configured to provide charging alert notifications from the electrified vehicle to the one or more electrified recreational vehicles during group off-roading events. The charging alert notifications indicate the need for the one or more electrified recreational vehicles to return to the electrified vehicle during the off-roading event for charging in order to avoid a no start/stranded condition. These and other features of this disclosure are discussed in greater detail in the following paragraphs of this detailed description.

Figure 1:
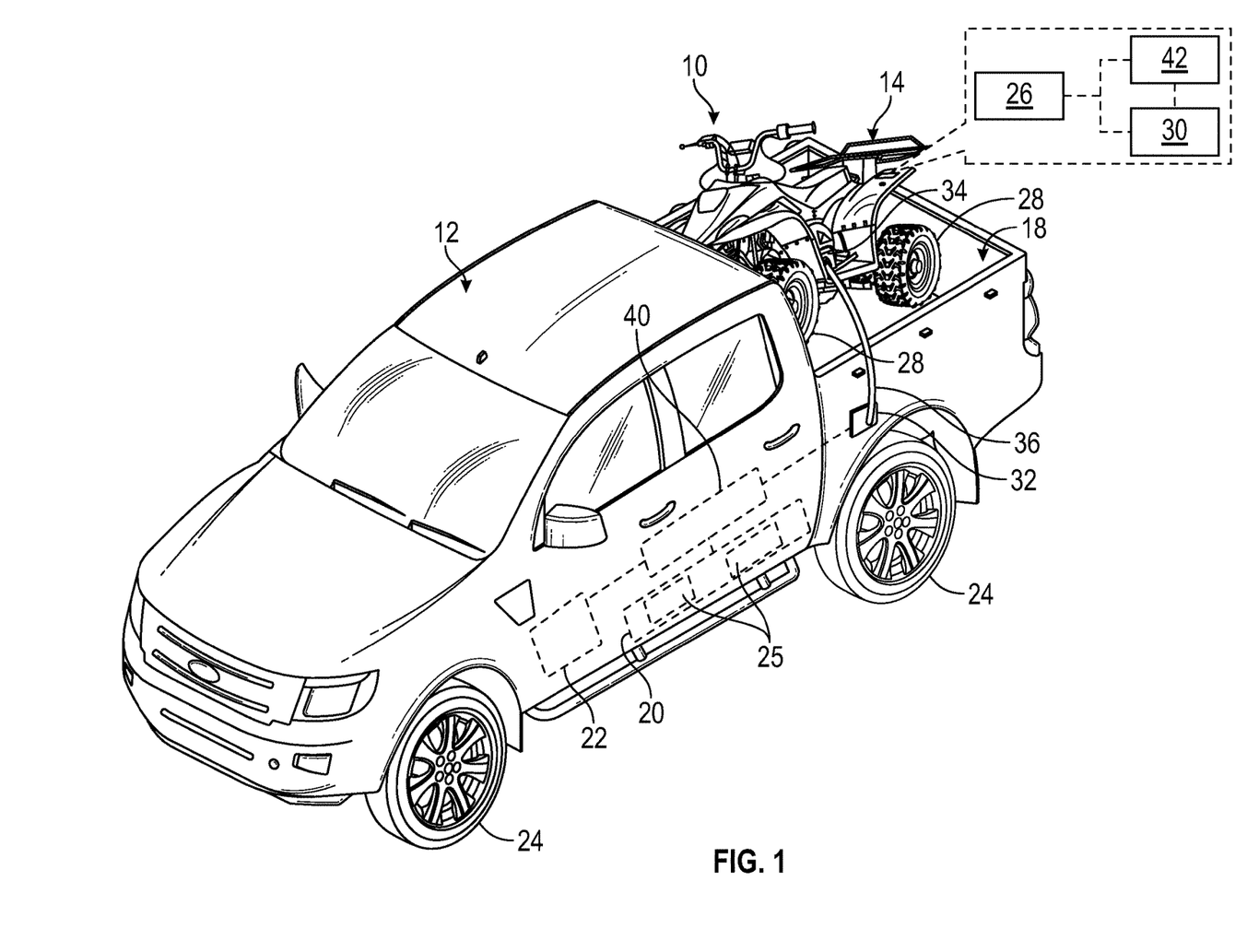
FIG. 1 schematically illustrates an exemplary vehicle-to-recreational vehicle energy transfer system.

FIG. 1 schematically illustrates an exemplary vehicle-to-recreational vehicle (V2RV) energy transfer system 10 (hereinafter "the system 10") for bidirectionally transferring energy between a towing or leading electrified vehicle 12 and a towed or trailing electrified recreational vehicle 14. Energy may be bidirectionally transferred between the electrified vehicle 12 and the electrified recreational vehicle 14 either while the vehicles are stationary or during "in-flight" situations. In this disclosure, the term "in-flight" means during the coupled movement of the electrified vehicle 12 and the electrified recreational vehicle 14, such as when the electrified vehicle 12 is hauling or towing the electrified recreational vehicle 14. Accordingly, the system 10 may enable the bidirectional transfer of energy from the electrified vehicle 12 to the electrified recreational vehicle 14 or vice-versa while the respective vehicles are making forward progress toward their desired destinations.

The system 10 may be utilized to achieve bidirectional energy transfers between the electrified vehicle 12 and one or more electrified recreational vehicles 14. Thus, although a single electrified recreational vehicle 14 is illustrated in FIG. 1, this disclosure is not limited to that specific configuration.

In an embodiment, the electrified recreational vehicle 14 may be positioned within a cargo space 18 (e.g., a truck bed, etc.) of the electrified vehicle 12 during the bidirectional energy transfer event. In another embodiment, the electrified recreational vehicle 14 may be positioned within a towing trailer 16 that is releasably coupled to the electrified vehicle 12 during the bidirectional energy transfer event (see, e.g., FIG. 2). The specific configuration of the towing trailer 16 is not intended to limit this disclosure. In yet another embodiment, the electrified recreational vehicle 14 may simply be parked adjacent to the electrified vehicle 12 during the bidirectional energy transfer event.

The electrified vehicle 12 of FIG. 1 is schematically illustrated as a pickup truck. However, other vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

The electrified recreational vehicle 14 of FIG. 1 is schematically illustrated as a four-wheeled all-terrain vehicle (ATV). However, other recreational vehicle configurations are also contemplated. The teachings of this disclosure may be applicable for any type of recreational vehicle. For example, the electrified recreational vehicle 14 could be any type of ATV, utility vehicle (UTV), motorcycle, bike, dirt bike, snowmobile, off-road vehicle, etc.

In an embodiment, the electrified vehicle 12 is a plug-in type electrified vehicle (e.g., a plug-in hybrid electric vehicle (PHEV) or a battery electric vehicles (BEV)). The electrified vehicle 12 may include an electrified powertrain capable of applying a torque from an electric machine 22 (e.g., an electric motor) for driving one or more drive wheels 24 of the electrified vehicle 12. The electrified vehicle 12 may include a traction battery pack 20 for powering the electric machine 22 and other electrical loads of the electrified vehicle 12. The powertrain of the electrified vehicle 12 may electrically propel the drive wheels 24 either with or without the assistance of an internal combustion engine.

In an embodiment, the electrified recreational vehicle 14 is an all-electric recreational vehicle having an electrified powertrain capable of applying torque from an electric machine 26 (e.g., an electric motor) for driving one or more drive wheels 28 of the electrified recreational vehicle 14. The electrified recreational vehicle 14 may include a traction battery pack 30 for powering the electric machine 26. The powertrain of the electrified recreational vehicle 14 may electrically propel the drive wheels 28 without any assistance from an internal combustion engine.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

Although shown schematically, the traction battery pack 20 of the electrified vehicle 12 may be configured as a high voltage traction battery pack that includes a plurality of battery arrays 25 (i.e., battery assemblies or groupings of battery cells) capable of outputting electrical power to the electric machine 22 of the electrified vehicle 12. Other types of energy storage devices and/or output devices may also be used to electrically power the electrified vehicle 12.

The traction battery pack 30 of the electrified recreational vehicle 14 may be a removable high voltage traction battery that includes a plurality of battery cells or groupings of battery cells. In an embodiment, the traction battery pack 30 is a removable traction battery that may be swapped out and replaced with another traction battery.

In general, the traction battery pack 30 of the electrified recreational vehicle 14 is a smaller battery than the traction battery pack 20 of the electrified vehicle 12. However, both batteries are capable of supplying high voltage power for electrically propelling the electrified vehicle 12 or the electrified recreational vehicle 14.

From time to time, charging the energy storage devices of the traction battery pack 20 of the electrified vehicle 12 and/or and the traction battery pack 30 of the electrified recreational vehicle 14 may be required or desirable. Each vehicle 12, 14 may therefore be equipped with a charging system. The charging system of the electrified vehicle 12 may include a charge port assembly 32, and the charging system of the electrified recreational vehicle 14 may include a charge port assembly 34. A charge cable 36 (i.e., EVSE) may be connected to each respective charge port assembly 32, 34 in order to transfer charge energy from the traction battery pack 20 of the electrified vehicle 12 to the traction battery pack 30 of the electrified recreational vehicle 14 or from the traction battery pack 30 of the electrified recreational vehicle 14 to the traction battery pack 20 of the electrified vehicle 12. The charge port assemblies 32, 34 and the charge cable 36 may be configured to provide any level of charging (e.g., Level 1 AC charging, Level 2 AC charging, DC charging, etc.).

Figure 2:
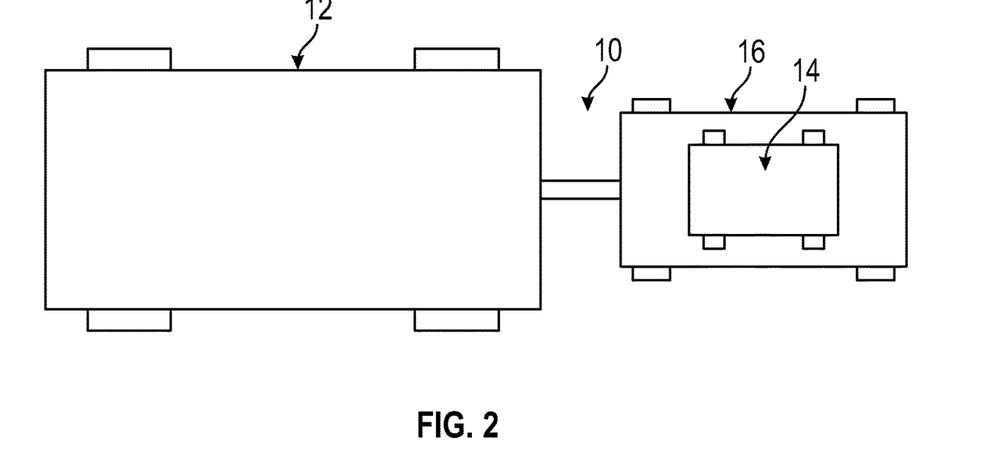
FIG. 2 schematically illustrates an exemplary towing configuration between an electrified vehicle and an electrified recreational vehicle.
Figure 3:
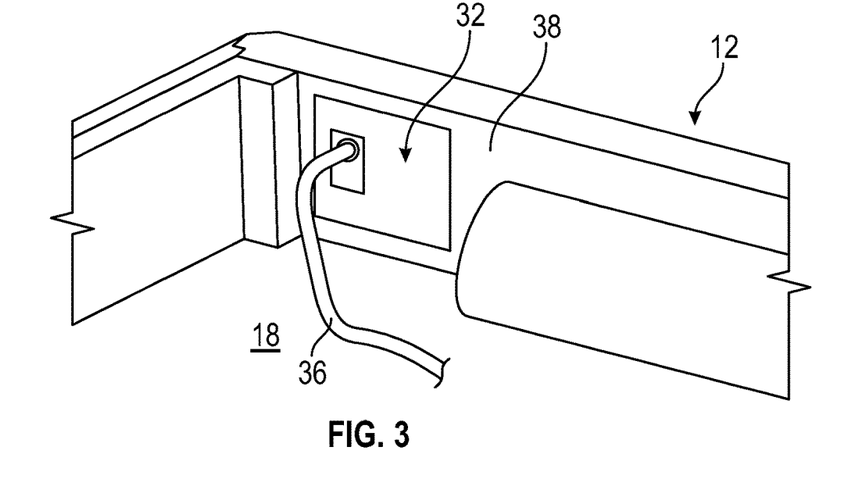
FIG. 3 illustrates an exemplary charge port location for an electrified vehicle equipped to perform a vehicle-to-recreational vehicle bidirectional energy transfer.

The mounting locations of the charge port assemblies 32, 34 are exemplary only and thus not intended to limit this disclosure. In the embodiment of FIGS. 1-2, the charge port assembly 32 of the electrified vehicle 12 is located at the exterior body of the electrified vehicle 12. However, the charge port assembly 32 could alternatively or additionally be provided within the cargo space 18, such as within a wall 38 associated with the cargo space 18 (see, e.g., FIG. 3), for example. Moreover, although only a single charge port assembly for each respective vehicle 12, 14 is shown, the electrified vehicle 12 and/or the electrified recreational vehicle 14 could be equipped with one or more additional charging interfaces, with each charging interface including one or more charge ports for connecting one or more charge cables for performing bidirectional energy transfer events.

The charging system of the electrified vehicle 12 may additionally include a bidirectional power transfer system 40, and the charging system of the electrified recreational vehicle 14 may additionally include a bidirectional power transfer system 42. The bidirectional power transfer systems 40, 42 may be configured for enabling the bidirectional transfer of power between the respective vehicles 12, 14.

The bidirectional power transfer system 40 may be operably connected between the charge port assembly 32 and the traction battery pack 20 of the electrified vehicle 12. The bidirectional power transfer system 40 may include various equipment, such as a charger, a converter, a motor controller (which may be referred to as an inverter system controller or ISC), etc., arranged and configured to establish the bidirectional transfer of electrical energy between the traction battery pack 20 and another traction battery pack (e.g., the traction battery pack 30). The bidirectional power transfer system 40 may additionally be configured to transfer energy between the traction battery pack 20 and the electric machine 22.

The bidirectional power transfer system 42 may be operably connected between the charge port assembly 34 and the traction battery pack 30 of the electrified recreational vehicle 14. The bidirectional power transfer system 42 may include various equipment, such as a charger, a converter, a motor controller (which may be referred to as an inverter system controller or ISC), etc., arranged and configured to establish the bidirectional transfer of electrical energy between the traction battery pack 30 and another traction battery pack (e.g., the traction battery pack 20). The bidirectional power transfer system 42 may additionally be configured to transfer energy between the traction battery pack 30 and the electric machine 26.

One non-limiting example of a suitable bidirectional power transfer system that may be employed for use within the electrified vehicle 12 and/or the electrified recreational vehicle 14 for achieving bidirectional power transfer is disclosed within US Patent Publication No. 2020/0324665, assigned to Ford Global Technologies, LLC, the disclosure of which is herein incorporated by reference. However, other bidirectional power transfer systems could also be utilized for achieving the bidirectional transfer of power within the scope of this disclosure.

The system 10 of FIG. 1 may be utilized to achieve various charging configurations between the electrified vehicle 12 and one or more electrified recreational vehicles 14. Non-limiting examples of the types of charging configurations that may be achieved by the system 10 are described below with reference to FIGS. 4A-4F.

Figure 4A:
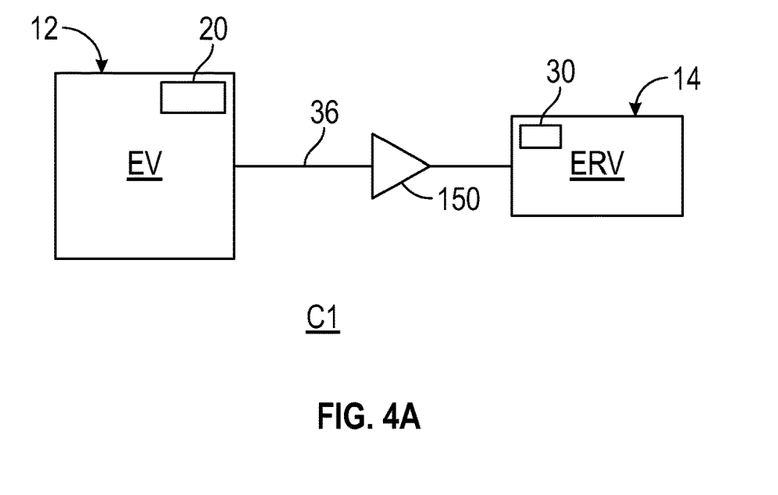
FIGS. 4A, 4B, 4C, 4D, 4E, and 4F illustrate various charging configurations that can be achieved by the vehicle-to-recreational vehicle energy transfer system of FIG. 1.

FIG. 4A schematically illustrates a first charging configuration C1 that can be provided by the system 10. During the first charging configuration C1, power may be transferred (e.g., via the charge cable 36) from the traction battery pack 20 of electrified vehicle 12 to the traction battery pack 30 of the electrified recreational vehicle 14 (as schematically depicted by arrow 150).

Figure 4B:
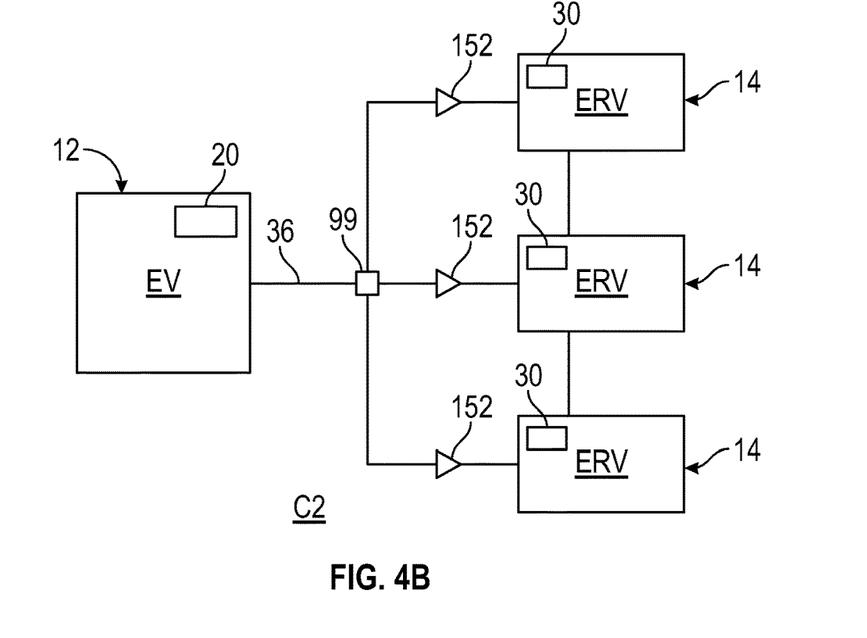

FIG. 4B schematically illustrates a second charging configuration C2 of the system 10. During the second charging configuration C2, power may be transferred from the traction battery pack 20 of electrified vehicle 12 to the traction battery packs 30 associated with multiple (i.e., two or more) participating electrified recreational vehicles 14 (as schematically depicted by arrows 152). The second charging configuration C2 may be referred to as a splitter configuration.

The second charging configuration C2 may be achieved using one or more charge cables 36. If using a single charge cable 36, the charge cable 36 could include a splitter 99 for dividing the power into multiple charge cable legs.

Figure 4C:
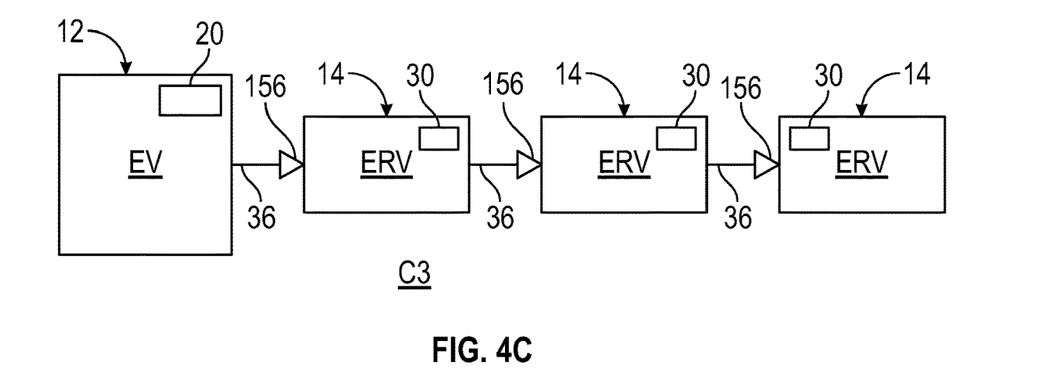

FIG. 4C schematically illustrates a third charging configuration C3 of the system 10. During the third charging configuration C3, power may be transferred from the traction battery pack 20 of electrified vehicle 12 to the traction battery packs 30 associated with multiple participating electrified recreational vehicles 14 (as schematically depicted by arrows 156) in series. The third charging configuration C3 may therefore be referred to as a serial configuration.

Multiple charge cables 36 may be provided for achieving the third charging configuration C3. In an embodiment, the charge cables 36 are arranged in a daisy-chain or pigtail configuration for the third charging configuration C3.

Figure 4D:
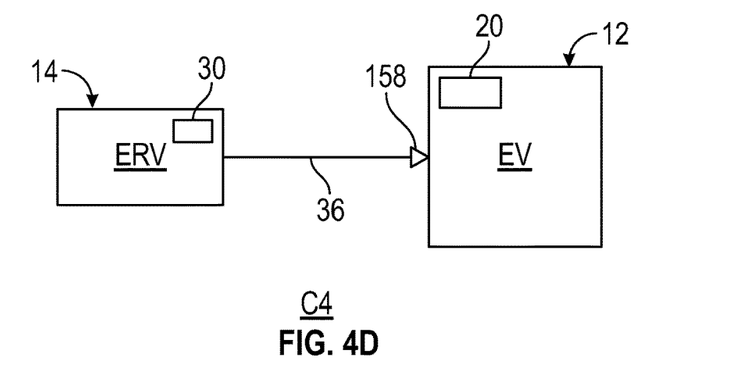

FIG. 4D schematically illustrates a fourth charging configuration C4 of the system 10. During the fourth charging configuration C4, power may be transferred from the traction battery pack 30 of the electrified recreational vehicle 14 to the traction battery pack 20 of the electrified vehicle 12 (as schematically illustrated by arrow 158). In this way, the electrified recreational vehicle 14 may periodically charge the electrified vehicle 12 to increase the travel range of the electrified vehicle 12.

Figure 4E:
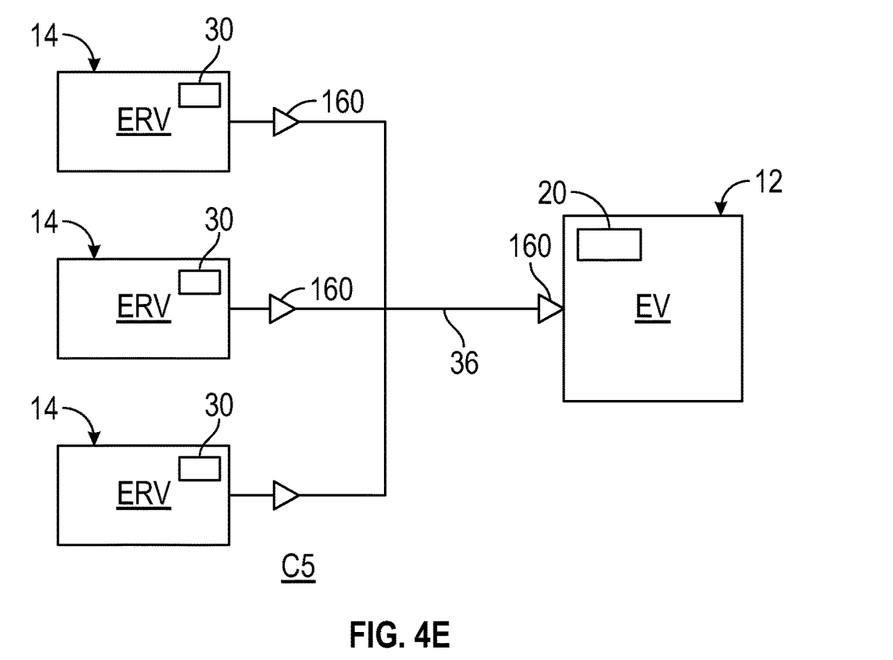

FIG. 4E schematically illustrates a fifth charging configuration C5 of the system 10. During the fifth charging configuration C5, power may be transferred from the traction battery packs 30 of multiple participating electrified recreational vehicles 14 to the traction battery pack 20 of the electrified vehicle 12 (as schematically depicted by arrows 160). The fifth charging configuration C5 may be referred to as a multiplexer configuration. The fifth charging configuration C5 may be achieved using one or more charge cables 36.

Figure 4F:
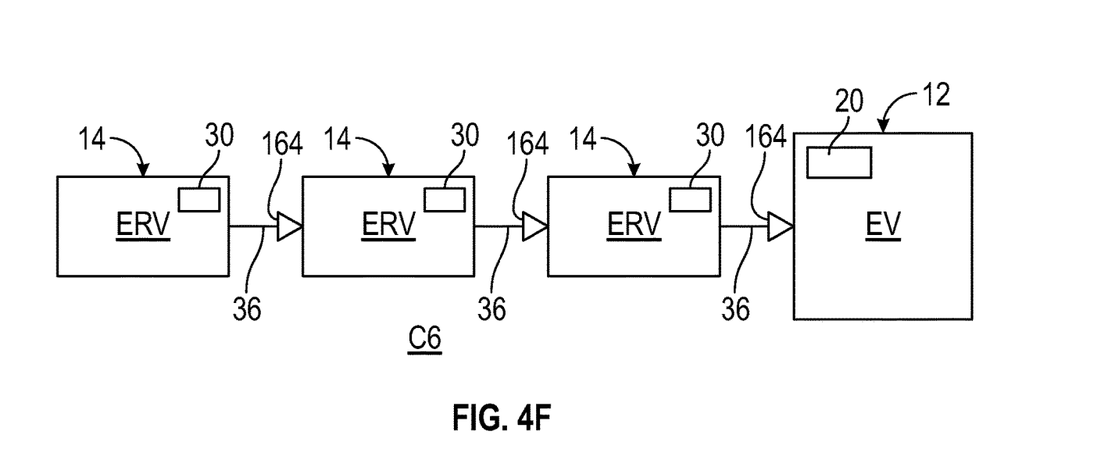

FIG. 4F schematically illustrates a sixth charging configuration C6 of the system 10. During the sixth charging configuration C6, power may be transferred in series from the traction battery packs 30 of the multiple participating electrified recreational vehicles 14 to the traction battery pack 20 of the electrified vehicle 12 (as schematically depicted by arrows 164). The sixth charging configuration C6 is another possible serial configuration.

Multiple charge cables 36 may be provided for achieving the sixth charging configuration C6. In an embodiment, the charge cables 36 are arranged in a daisy-chain or pigtail configuration for the sixth charging configuration C6.

The users of the electrified recreational vehicles 14 associated with the system 10 may periodically take off-roading trips together in groups. Many users want to know the respective locations of the other users within the group when off-roading together. It may also be desirable for users to know when another user in the group needs to return to base camp for charging their respective electrified recreational vehicle 14. This disclosure is therefore directed to coordinating and providing charging alert notifications to members of the group during group off-roading events for alerting the users of the need to charge their respective electrified recreational vehicles 14.

Figure 5:
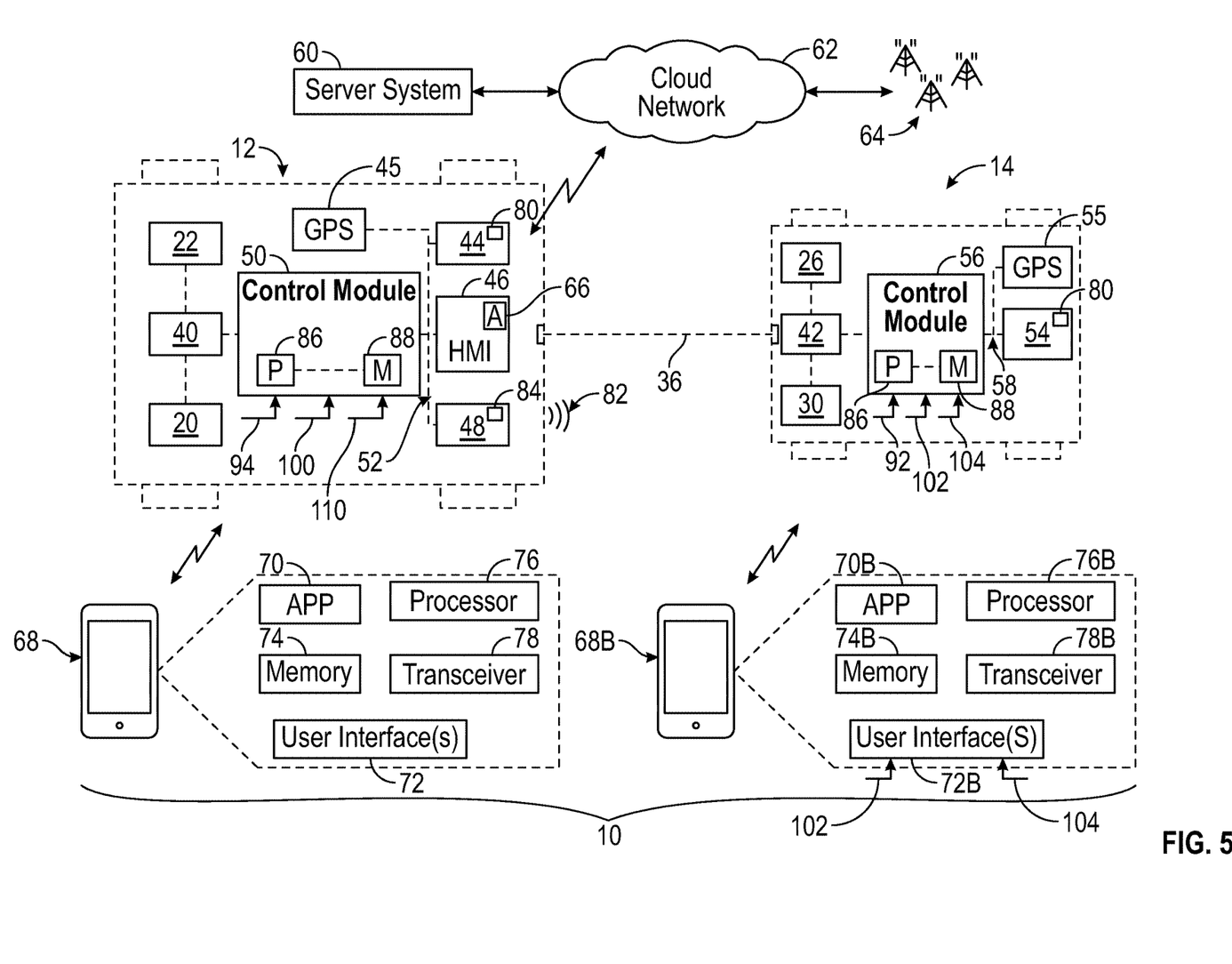
FIG. 5 schematically illustrates exemplary aspects of a vehicle-to-recreational vehicle energy transfer system.

Additional functionality of the system 10 of FIGS. 1-4F is schematically detailed in FIG. 5. In particular, FIG. 5 schematically illustrates features that enable the system 10 to coordinate and provide charging related alert notifications from the electrified vehicle 12, which may act as the communications hub of the system 10, to one or more electrified recreational vehicles 14.

In an embodiment, the system 10 includes components from both the electrified vehicle 12 and the electrified recreational vehicle 14. For example, the electrified vehicle 12 may include, among other things, a telecommunications module 44, a global positioning system (GPS) 45, a human machine interface (HMI) 46, an alert system 48, and a control module 50. These components may be interconnected and in electronic communication with one another over a communication bus 52. The communication bus 52 may be a wired communication bus such as a controller area network (CAN) bus, or a wireless communication bus such as Wi-Fi, Bluetooth®, Ultra-Wide Band (UWB), etc.

As further part of the system 10, the electrified recreational vehicle 14 may include, among other things, a telecommunications module 54, a GPS 55, and a control module 56. These components may be interconnected and in electronic communication with one another over a communication bus 58. The communication bus 58 may be a wired communication bus such as a controller area network (CAN) bus, or a wireless communication bus such as Wi-Fi, Bluetooth®, Ultra-Wide Band (UWB), etc.

The telecommunications modules 44, 54 may be configured for achieving bidirectional communication between the electrified vehicle 12 and the one or more electrified recreational vehicles 14 over a cloud-based server system 60, such as for coordinating and providing charging related alert notifications for executing bidirectional energy transfers. Each telecommunications module 44, 54 may communicate over a cloud network 62 (i.e., the internet) to obtain various information stored on the server system 60 or to provide information to the server system 60 that can subsequently be accessed by the electrified vehicle 12 and/or the electrified recreational vehicle 14 (and/or other participating vehicles). The server system 60 can identify, collect, and store user data associated with both the electrified vehicle 12 and the electrified recreational vehicle 14 for validation purposes. Upon an authorized request, data may be subsequently transmitted to the telecommunications modules 44, 54 via one or more cellular towers 64 or via some other known communication technique (e.g., Wi-Fi, Bluetooth®, RFID, data connectivity, etc.). The information can then be communicated to the control module 50 and/or the control module 56 for further processing. Each telecommunications module 44, 54 can receive data from the server system 60 or communicate data back to the server system 60 via the cellular tower(s) 64. Although not necessarily shown or described in this highly schematic embodiment, numerous other components may enable bidirectional communication between the vehicles 12, 14 via the server system 60.

In an embodiment, a user/owner of the electrified vehicle 12 may interface with the server system 60 using the HMI 46. For example, the HMI 46 may be equipped with an application 66 (e.g., FordPass™ or another similar software application) for interfacing with the server system 60. The HMI 46 may be located within a passenger cabin of the electrified vehicle 12 and may include various user interfaces for displaying information to the vehicle occupants and for allowing the vehicle occupants to enter information into the HMI 46. The vehicle occupants may interact with the user interfaces presentable on the HMI 46 via touch screens, tactile buttons, audible speech, speech synthesis, etc.

In another embodiment, the user/owner of the electrified vehicle 12 may alternatively or additionally interface with the server system 60 using a personal electronic device 68 (e.g., a smart phone, tablet, computer, wearable smart device, etc.). The personal electronic device 68 may include an application 70 (e.g., FordPass™ or another similar software application) that includes programming to allow the user to employ one or more user interfaces 72 for setting or controlling certain aspects of the system 10. The application 70 may be stored in memory 74 of the personal electronic device 68 and may be executed by a processor 76 of the personal electronic device 68. The personal electronic device 68 may additionally include a transceiver 78 that is configured to communicate with the server system 60 over the cellular tower(s) 64 or some other wireless link.

In an embodiment, the user/owner of each electrified recreational vehicle 14 may interface with the server system 60 using either the personal electronic device 68 or another personal electronic device 68B (e.g., a smart phone, tablet, computer, wearable smart device, etc.). The personal electronic device 68 may be used to communicate with the server system 60 when the user of the electrified recreational vehicle 14 is the same user/owner of the electrified vehicle 12, and the personal electronic device 68B may be used communicate with the server system 60 when the user of the electrified recreational vehicle 14 is a different user from the user/owner of the electrified vehicle 12. In general, each user of a group of electrified recreational vehicles 14 that have been paired to the system 10, such as via the web-based application stored on the personal electronic device, for group off-roading events would include his/her own personal electronic device for interfacing with, communicating with, and/or accessing the server system 60.

The personal electronic device 68B may include an application 70B (e.g., FordPass™ or another similar software application) that includes programming to allow the user to employ one or more user interfaces 72B for setting, controlling, or viewing certain aspects of the system 10. The application 70B may be stored in memory 74B of the personal electronic device 68B and may be executed by a processor 76B of the personal electronic device 68B. The personal electronic device 68B may additionally include a transceiver 78B that is configured to communicate with the server system 60 over the cellular tower(s) 64 or some other wireless link.

Each telecommunications module 44, 54 may additionally include one or more wireless devices 80 that facilitate the detection of and communication with nearby devices or vehicles, such as the electrified vehicle 12 or the electrified recreational vehicle 14, for example. Various information may be exchanged between the electrified vehicle 12 and the electrified recreational vehicle 14 via the wireless devices 80.

In an embodiment, the wireless devices 80 are Bluetooth® Low Energy (BLE) transceivers configured to receive and/or emit low energy signals as a way to detect and communicate with participating vehicles of the system 10. However, other types of wireless devices (e.g., WiFi, V2V, RFID, etc.) are also contemplated within the scope of this disclosure for enabling bidirectional communications between the electrified vehicle 12 and one or more electrified recreational vehicles 14.

Each GPS 45, 55 may be configured to pinpoint exact locations of the electrified vehicle 12 and the one or more electrified recreational vehicles 14, such as by using satellite navigation techniques. In an embodiment, location data concerning each electrified recreational vehicle 14 is periodically communicated to the electrified vehicle 12 during group off-roading events. In another embodiment, location data and/or driving instructions may be communicated to the electrified vehicle 12 and/or each electrified recreational vehicle 14 for indicating the location where the electrified vehicle 12 and the one or more electrified recreational vehicle 14 should meet to begin a bidirectional energy transfer event.

The alert system 48 is configured to selectively produce and broadcast audible instructions 82 for providing guidance to users of the system 10 once the vehicles 12, 14 are within close proximity to one another for preparing for an impending bidirectional charging event. For example, the alert system 48 may produce the audible instructions 82 for linking the charge cable 36 between the participating vehicles 12, 14 of the system 10. The alert system 48 may include one or more audio actuators 84 (e.g., speakers, sound exciters, etc.) adapted for broadcasting the audible instructions 82. Visual guidance at the HMI 46, the personal electronic device 68, and/or the personal electronic device 68B may alternatively or additionally be provided for guiding the users prior to, during, and/or after the bidirectional charging event.

The control modules 50, 56 may each include both hardware and software and could be part of an overall vehicle control system, such as a vehicle system controller (VSC), or could alternatively be a stand-alone controller separate from the VSC. In an embodiment, each control module 50, 56 is programmed with executable instructions for interfacing with and commanding operation of various components of the system 10. Although shown as separate modules within the highly schematic depiction of FIG. 5, the telecommunications module 44, the GPS 45, the HMI 46, and the control module 50 could be integrated together as part of common module within the electrified vehicle 12, and the telecommunications module 54, the GPS 55, and the control module 56 could be integrated together as part of a common module within the electrified recreational vehicle 14.

Each control module 50, 56 may include a processor 86 and non-transitory memory 88 for executing various control strategies and modes associated with the system 10. The processors 86 can be custom made or commercially available processors, central processing units (CPUs), or generally any device for executing software instructions. The memory 88 can include any one or combination of volatile memory elements and/or nonvolatile memory elements.

The processor 86 may be operably coupled to the memory 88 and may be configured to execute one or more programs stored in the memory 88 of each control module 50, 56 based on the various inputs received from other devices. In an embodiment, the application 66, which includes programming for allowing the vehicle user to employ one or more user interfaces within the HMI 46 for setting or controlling certain aspects of the system 10, may be stored in the memory 88 and may be executed by the processor 86 of the control module 50. In another embodiment, the control module 50 may be configured to communicate and interface with the personal electronic device 68 for coordinating and/or executing certain aspects of the system 10, and the control module 56 may be configured to communicate and interface with the personal electronic device 68B for coordinating and/or executing certain aspects of the system 10.

In an embodiment, such as during group off-roading events, for example, the control module 50 of the electrified vehicle 12 may periodically command the telecommunications module 44 to communicate with the electrified recreational vehicle 14 (and any other participating electrified recreational vehicles paired to the system 10) for obtaining location data 100 and battery capacity/range data 110 concerning the electrified recreational vehicle 14. The telecommunications module 44 may communicate with the telecommunications module 54 of the electrified recreational vehicle 14 for exchanging these types of data.

In an embodiment, the location data 100 is obtained from the GPS 55 of the electrified recreational vehicle 14. In another embodiment, the location data 100 is obtained from the personal electronic device 68B associated with the electrified recreational vehicle 14, such as by using cellular triangulation techniques, for example. In yet another embodiment, the location data 100 may be derived from the wireless devices 80 of the telecommunications modules 44, 54, such as by using BLE triangulation techniques, for example. However, other techniques are also contemplated within the scope of this disclosure for retrieving the location data 100 from each participating electrified recreational vehicle 14 of the system 10.

The location data 100 may include spatial coordinate information concerning the location of the electrified recreational vehicle 14 relative to the electrified vehicle 12. One type of spatial coordinate information that may be included as part of the location data 100 collected by the electrified vehicle 12 is a relative distance of the electrified recreational vehicle 14 from the electrified vehicle 12. The relative distance may be defined as the distance required for the electrified recreational vehicle 14 to return to the location of the electrified vehicle 12 following the same path the electrified recreational vehicle 14 took to reach its current location. Stated another way, the relative distance is the distance required to retrace the route taken to reach the current location of the electrified recreational vehicle 14 back to the electrified vehicle 12. The relative distance is an important characteristic of the location data 100 because retracing the travel path of the electrified recreational vehicle 14 may be the only way back to the electrified vehicle 12 during off-roading events.

Another type of spatial coordinate information that may be included as part of the location data 100 is amount of charge utilized per a fixed distance information. The charge utilized per the fixed distance information may be defined as the amount of charge expended by the traction battery pack 30 of the electrified recreational vehicle 14 to travel a predefined distance (e.g., one mile or one kilometer or any other increment) along the path taken to reach the current location of the electrified recreational vehicle 14. The charge utilized per fixed distance information may be utilized by the control module 50 of the electrified vehicle 12 to estimate whether the current state of charge (SOC, typically displayed as a percentage) of the traction battery pack 30 of the electrified recreational vehicle 14 is a sufficient amount of charge to return to the electrified vehicle 12, for example.

The battery capacity/range data 110 may include information such as the current state of charge of the traction battery pack 30. The battery capacity/range data 110 may alternatively or additionally include information such as the current amount of available travel range (i.e., distance to empty information) of the electrified recreational vehicle 14.

The control module 50 may be configured to communicate (e.g., via the telecommunications module 44) a charging alert notification 102 to the user of the electrified recreational vehicle 14 when one or more predefined conditions have been met. In an embodiment, the one or more predefined conditions may allow the control module 50 to predict whether or not a no start/stranded condition of the electrified recreational vehicle 14 is likely. The no start/stranded condition is a condition in which the electrified recreational vehicle 14 is unable to return to the location of the electrified vehicle 12 because of insufficient battery charge levels.

In an embodiment, the charging alert notification 102 may be displayed on the personal electronic device 68/68B associated with the electrified recreational vehicle 14 that needs charged. The charging alert notification 102 signifies to the user of the electrified recreational vehicle 14 that he/she needs to return to the electrified vehicle 12 for charging in order to avoid a no start/stranded condition. In another embodiment, the charging alert notification 102 may be communicated to each user of the group when any one of the other members of the group requires charging during the group off-roading event.

In an embodiment, the charging alert notification 102 may be automatically communicated from the electrified vehicle 12 to the electrified recreational vehicle 14 when greater than a predefined percentage of a remaining state of charge of the traction battery pack 30 of the electrified recreational vehicle 14 would be required in order for the electrified recreational vehicle 14 to travel the relative distance between the electrified recreational vehicle 14 and the electrified vehicle 12. The predefined percentage may be set at 70%, 80%, or any other threshold amount.

In another embodiment, the charging alert notification 102 may be automatically communicated from the electrified vehicle 12 to the electrified recreational vehicle 14 when a remaining state of charge of the traction battery pack 30 of the electrified recreational vehicle 14 is less than or equal to a predefined percentage of the amount of charge that was required to reach the current location of the electrified recreational vehicle 14. The predefined percentage may be set at 110%, 115%, 120%, or any other threshold amount.

The control module 50 of the electrified vehicle 12 may be further configured to communicate (e.g., via the telecommunications module 44) driving instructions 104 to the user of the electrified recreational vehicle 14 when the traction battery pack 30 of the electrified recreational vehicle 14 has an insufficient amount of charge or available travel range to return to the location of the electrified vehicle 12. The driving instructions 104 may include turn-by-turn directions for driving to a rendezvous location that is within the travel range of the electrified recreational vehicle 14 and where the electrified vehicle 12 and/or other participating electrified recreational vehicles of the group can meet the electrified recreational vehicle 14 for charging.

In another embodiment, the control module 50 of the electrified vehicle 12 may communicate (e.g., via the telecommunications modules 44, 54) a charging details request signal 92 to the control module 56 of the electrified recreational vehicle 14 in preparation for performing a bidirectional energy transfer event. The charging details request signal 92 my request details related to the traction battery pack 30 of the electrified recreational vehicle 14, including but not limited to, battery size, state of charge, recommended charging rate, current battery temperature, recommended battery temperature range, vehicle range (e.g., in miles or operating time per unit of kilowatt-hours), typical battery temperature increase during fast charging versus ambient temperature, charge acceptance at current temperature, battery health data, etc.

In response to receiving the charging details request signal 92, the control module 56 of the electrified recreational vehicle 14 may communicate a charging profile 94 to the control module 50 of the electrified vehicle 12. The charging profile 94 includes the details requested within the charging details request signal 92. The charging profile 94 may be used by the control module 50 for determining how to configure the bidirectional power transfer system 40 during the bidirectional energy transfer event. The charging profile 94 may further by used by the control module 50 for communicating with the control module 56 for determining how to configure the bidirectional power transfer system 42 during the bidirectional energy transfer event.

The control module 50 may store the charging profile 94 in the memory 88. The charging profile 94 may be accessed by the control module 50 each time the electrified recreational vehicle 14 is reconnected to the electrified vehicle 12 for bidirectional charging. The charging profile 94 may also be updated with new information each time the electrified recreational vehicle 14 is reconnected to the electrified vehicle 12 for bidirectional charging.

In another embodiment, the control module 50 may be configured to estimate certain charging-related details pertaining to the electrified recreational vehicle 14 when the charging profile 94 is missing or incomplete. The control module 50 may estimate charging related details for a given electrified recreational vehicle 14 based on the stored charging profiles of similar electrified recreational vehicles, for example.

In yet another embodiment, the control module 50 may be configured to suggest a particular charging configuration of the system 10 based on information from the charging profile 94. The suggested charging configuration may be one that is best suited for charging the traction battery pack 30 of the participating electrified recreational vehicle 14.

In another embodiment, the control module 50 may command the alert system 48 to broadcast the audible instructions 82 for guiding the user to connect the charge cable 36 to both the electrified vehicle 12 and the electrified recreational vehicle 14 in preparation for performing bidirectional energy transfer events.

In another embodiment, the control module 50 may interface with and control the functionality of the bidirectional power transfer system 40 for coordinating and commanding the desired charging configuration of the system 10. The control module 50 may also control the wireless device 80 of the telecommunications module 44 for coordinating the desired power transfer with the control module 56 of the electrified recreational vehicle 14. The specific charging configuration commanded by the control module 50 may be predefined by the user, such as by using the HMI 46 or the personal electronic device 68, for example.

The control modules 50, 56 may further coordinate with one another for controlling the bidirectional power transfer systems 40, 42 for ending the bidirectional energy transfer event when a predefined threshold is exceeded. The predefined threshold may be an ambient temperature threshold, a charge acceptance threshold, a customer selected total energy threshold, etc.

Figure 6:
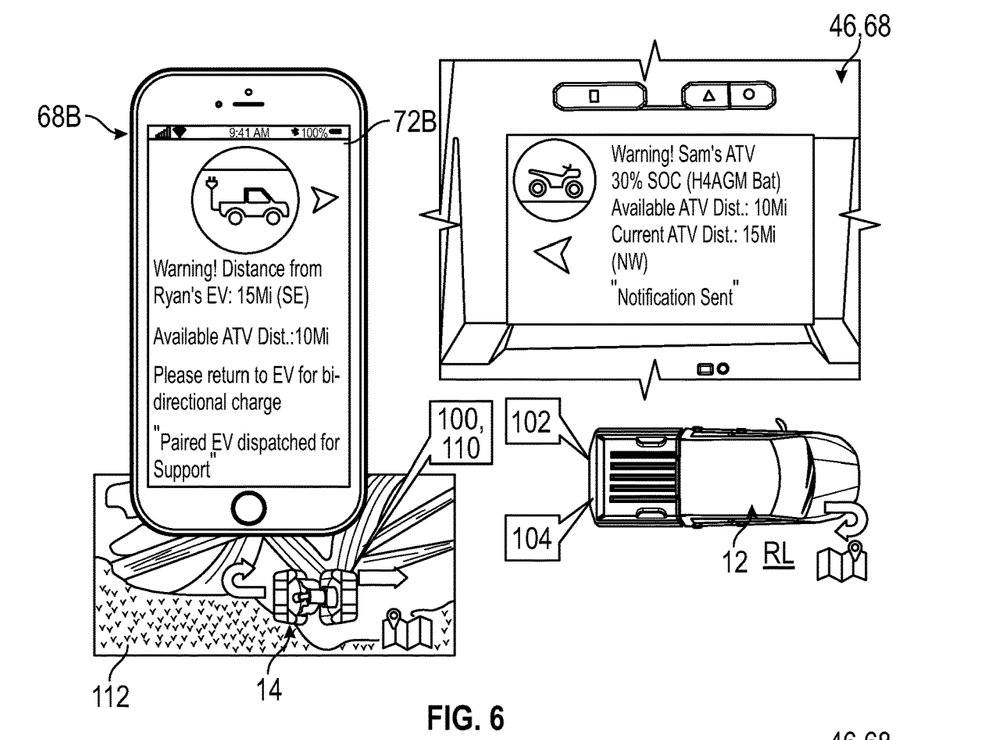
FIGS. 6 and 7 illustrate an exemplary use case for coordinating and providing charging alert notifications from an electrified vehicle to one or more electrified recreational vehicles during group off-roading events.
Figure 7:
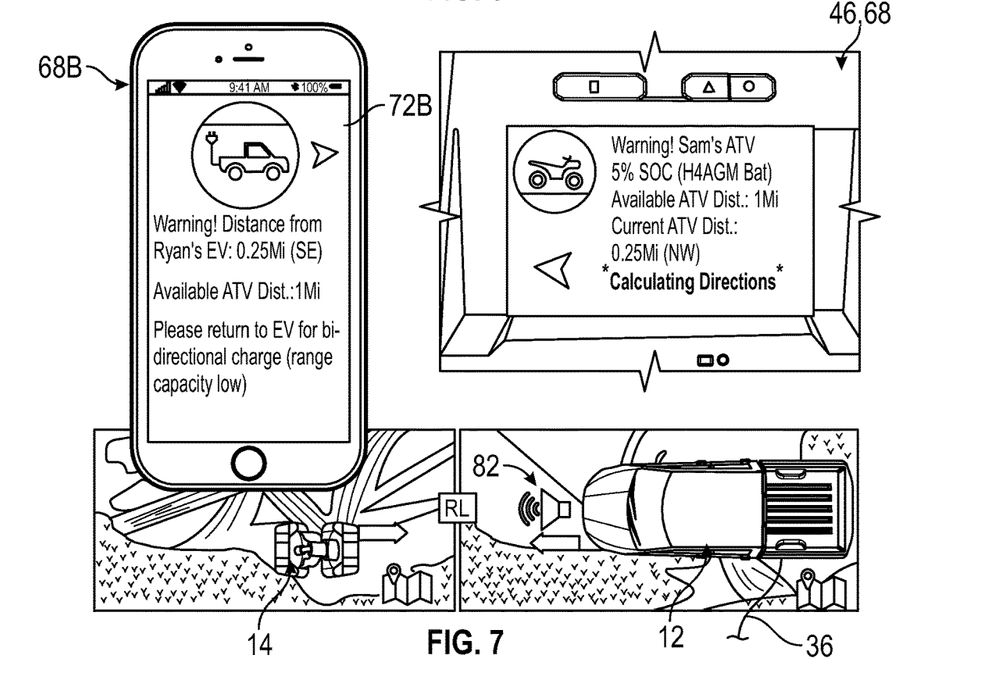

FIGS. 6-7, with continued reference to FIGS. 1-5, schematically illustrate an exemplary use case for coordinating and providing charging alert notifications from the electrified vehicle 12 to the one or more electrified recreational vehicles 14 via the system 10. The exemplary use case assumes that the electrified recreational vehicle 14 has an insufficient available travel range to return to a base location BL of the electrified vehicle 12 due to a current state of charge level of the traction battery pack 30. However, other use cases are further contemplated within the scope of this disclosure for providing alerts and other notifications during group off-roading events.

Referring first to FIG. 6, the electrified vehicle 12 may periodically request location data 100 and battery capacity/range data 110 from the electrified recreational vehicle 14 while the electrified recreational vehicle 14 is away from the electrified vehicle 12 and operating on an off-road trail 112. The electrified vehicle 12 may command communication of the charging alert notification 102 when the likelihood of a no start/stranded condition of the electrified recreational vehicle 14 is relatively high. The electrified vehicle 12 may further communicate the driving instructions 104 to the user of the electrified recreational vehicle 14 when the traction battery pack 30 of the electrified recreational vehicle 14 has an insufficient amount of charge to return to the base location BL of the electrified vehicle 12. Information related to the charging alert notification 102 and the driving instructions 104 may be displayed on both the HMI 46/personal electronic device 68 of the electrified vehicle 12 and on a user interface 72B associated with the personal electronic device 68B of the user of the electrified recreational vehicle 14.

Referring now to FIG. 7, the electrified recreational vehicle 14 may next begin traveling toward a rendezvous location RL indicated by the driving instructions 104. Once the vehicles 12, 14 are within a predefined distance of one another, the alert system 48 of the electrified vehicle 12 may be commanded to broadcast audible instructions 82 for linking the charge cable 36 between the electrified vehicle 12 and the electrified recreational vehicle 14. Energy may then be transferred from the electrified vehicle 12 to the electrified recreational vehicle 14 for charging the traction battery pack 30 of the electrified recreational vehicle 14.

Figure 8:
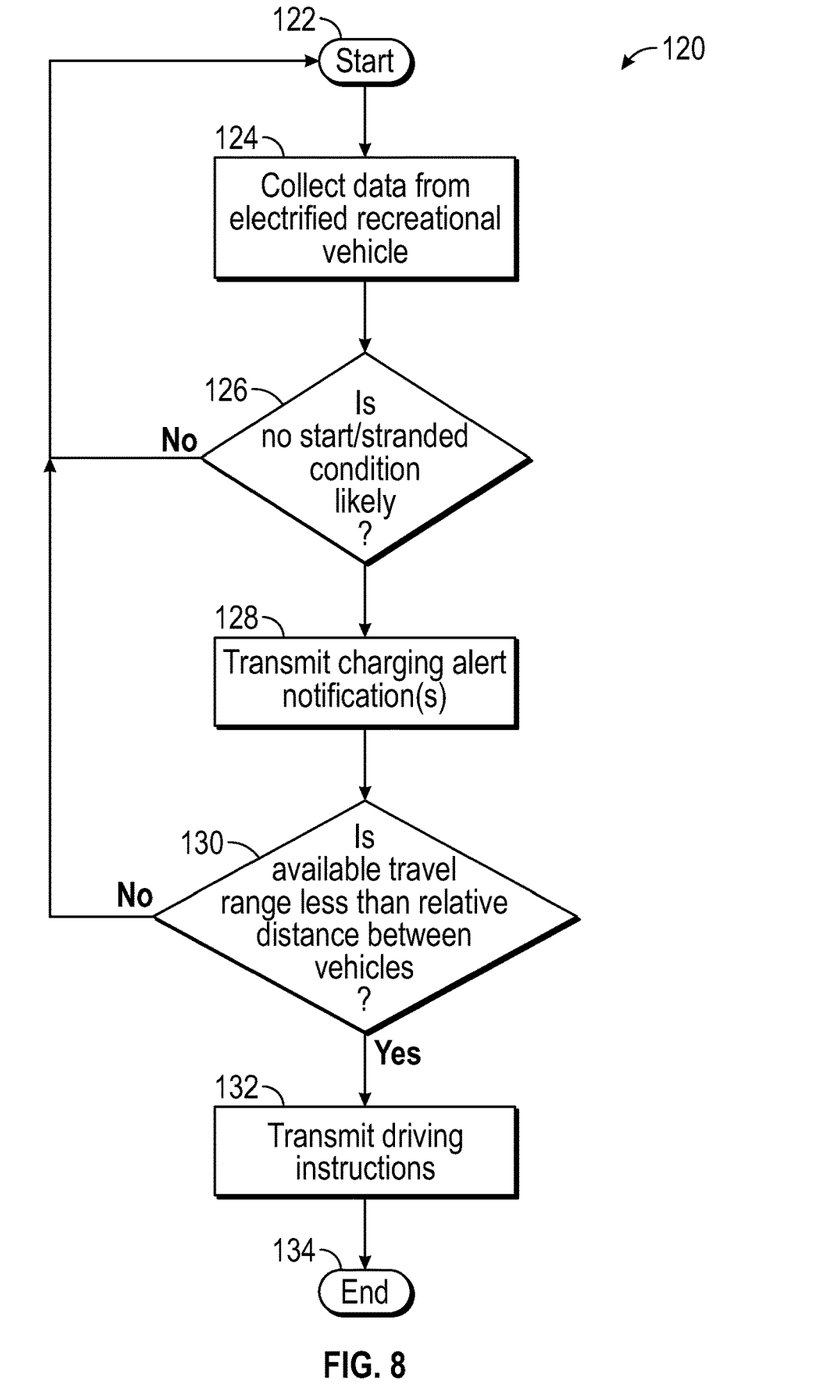
FIG. 8 schematically illustrates an exemplary method for coordinating and providing charging alert notifications during group off-road events.

FIG. 8, with continued reference to FIGS. 1-7, schematically illustrates, in flow chart form, an exemplary method 120 for coordinating and providing charging notifications during group off-roading events. The system 10 may be configured to employ one or more algorithms adapted to execute the steps of the exemplary method 120. For example, the method 120 may be stored as executable instructions in the memory 88 of the control module 50 of the electrified vehicle 12, and the executable instructions may be embodied within any computer readable medium that can be executed by the processor 86 of the control module 50. The instructions for performing the method 120 could additionally be stored within the memory 88 of the control module 56 of the electrified recreational vehicle 14.

The exemplary method 120 may begin at block 122. At block 124, data may be collected by the electrified vehicle 12 from the electrified recreational vehicle(s) 14. In an embodiment, the data collected may include location data 100 and battery capacity/range data 110. The location data 100 may include spatial coordinate information (e.g., relative distance and amount of charge expended per fixed distance information) concerning the location of the electrified recreational vehicle 14 relative to the electrified vehicle 12. The battery capacity/range data 110 may include an estimate of the current state of charge of the traction battery pack 30 and/or amount of available travel range of the electrified recreational vehicle 14.

At block 126, the method 120 predicts whether a no start/stranded condition of the electrified recreational vehicle 14 is likely. The control module 50 of the electrified vehicle 12 may deem the no start/stranded condition likely when greater than a predefined percentage of a remaining state of charge of the traction battery pack 30 of the electrified recreational vehicle 14 would be required in order for the electrified recreational vehicle 14 to travel the relative distance between the electrified recreational vehicle 14 and the electrified vehicle 12, or when a remaining state of charge of the traction battery pack 30 of the electrified recreational vehicle 14 is less than or equal to a predefined percentage of the amount of charge that was required to reach the current location of the electrified recreational vehicle.

If a YES flag is returned at block 126, the method 120 may proceed to block 128. The charging alert notification 102 may be communicated to the electrified recreational vehicle 14 and any other participating vehicles of the group at block 128.

Next, at block 130, the method 120 may determine whether the amount of available travel range of the electrified recreational vehicle 14 is less than the relative distance required to return to the electrified vehicle 12. If YES, the electrified vehicle 12 may transmit the driving instructions 104 to the electrified recreational vehicle 14 at block 132. The driving instructions 104 may alternatively or additionally be communicated to any other participating vehicles of the group who have excess charge that can be utilized to help charge the electrified recreational vehicle 14 at the rendezvous location. The method 120 may then end a block 134.

The method 120 described above is intended to be exemplary only. A greater or fewer number of steps could be performed by the system 10 within the scope of this disclosure.

The vehicle-to-recreational vehicle (V2RV) energy transfer systems of this disclosure are designed to provide bidirectional charging between road vehicles and recreational vehicles such as off-road vehicles. The proposed systems enhance electrified vehicle customer experiences by facilitating and executing charging alert notification strategies between the vehicle and one or more participating recreational vehicles. The proposed charging alert notification strategies may be especially advantageous during group off-roading events for avoiding no start/stranded conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle-to-recreational vehicle energy transfer system, comprising:
   an electrified vehicle;
   an electrified recreational vehicle; and
   a control module programmed to command communication of a charging alert notification to the electrified recreational vehicle when a no start/stranded condition of the electrified recreational vehicle is predicted to be likely.

2. The system as recited in claim 1, wherein the electrified vehicle includes a first traction battery pack and a first electric machine, and the electrified recreational vehicle includes a second traction battery pack and a second electric machine.

3. The system as recited in claim 1, wherein the control module is programmed to predict that the no start/stranded condition is likely when greater than a predefined percentage of a remaining state of charge of a traction battery pack of the electrified recreational vehicle is required in order for the electrified recreational vehicle to travel a relative distance between the electrified recreational vehicle and the electrified vehicle.

4. The system as recited in claim 1, wherein the control module is programmed to predict that the no start/stranded condition is likely when a remaining state of charge of a traction battery pack of the electrified recreational vehicle is less than or equal to a predefined percentage of an amount of charge required to reach a current location of the electrified recreational vehicle relative to the electrified vehicle.

5. The system as recited in claim 1, comprising a charge cable that is connectable to a first charge port assembly of the electrified vehicle and a second charge port assembly of the electrified recreational vehicle during a bidirectional energy transfer event.

6. The system as recited in claim 1, wherein the control module is further programmed to collect data from the electrified recreational vehicle during an off-roading event.

7. The system as recited in claim 6, wherein the data includes location data and battery capacity/range data.

8. The system as recited in claim 1, wherein the control module is a component of the electrified vehicle.

9. The system as recited in claim 1, wherein the control module is further programmed to receive a charging profile from the electrified recreational vehicle.

10. The system as recited in claim 1, wherein the control module is further programmed to command an alert system of the electrified vehicle to emit audible instructions for guiding a connection of the electrified vehicle to the electrified recreational vehicle prior to performing a bidirectional energy transfer event.

11. The system as recited in claim 1, wherein the control module is further programmed to communicate the charging alert notification to at least one additional electrified recreational vehicle.

12. The system as recited in claim 1, wherein the control module is further programmed to communicate driving instructions to the electrified recreational vehicle when the electrified recreational vehicle has an insufficient amount of remaining travel range to return to the electrified vehicle during an off-roading event.

13. The system as recited in claim 1, wherein the electrified vehicle is a pickup truck, and the electrified recreational vehicle is an all-terrain vehicle, a utility vehicle, a motorcycle, or a snowmobile.

14. An electrified vehicle, comprising:
    a telecommunications module; and
    a control module operably connected to the telecommunications module, wherein the control module is programmed to:
       collect data from an electrified recreational vehicle during an off-roading event;
       predict a likelihood of a no start/stranded condition of the electrified recreational vehicle based on the data; and
       in response to predicting the no start/stranded condition is likely, command the telecommunications module to communicate a charging alert notification to the electrified recreational vehicle.

15. The electrified vehicle as recited in claim 14, wherein the data includes location data and battery capacity/travel range data.

16. The electrified vehicle as recited in claim 14, wherein the no start/stranded condition is predicted as being likely when a relative distance between the electrified recreational vehicle and the electrified vehicle is greater than a predefined percentage of an available travel range of the electrified recreational vehicle.

17. The electrified vehicle as recited in claim 14, wherein the no start/stranded condition is predicted as being likely when a remaining state of charge of a traction battery pack of the electrified recreational vehicle is less than or equal to a predefined percentage of an amount of charge that was required to reach a current location of the electrified recreational vehicle.

18. The electrified vehicle as recited in claim 14, wherein the control module is further programmed to communicate driving instructions to the electrified recreational vehicle when the electrified recreational vehicle has an insufficient amount of remaining travel range to return to the electrified vehicle during the off-roading event.

19. The electrified vehicle as recited in claim 14, wherein the charging alert notification indicates a need to return to the electrified vehicle for charging to a user of the electrified recreational vehicle.

20. A method, comprising:
- collecting data from an electrified recreational vehicle during an off-roading event;
- predicting a likelihood of a no start/stranded condition of the electrified recreational vehicle based on the data; and
- in response to predicting that the no start/stranded condition is likely, communicating a charging alert notification to the electrified recreational vehicle.

\* \* \* \* \*